United States Patent [19]

Nakamura et al.

[11] Patent Number: 5,767,946
[45] Date of Patent: Jun. 16, 1998

[54] MICROFILM CAMERA WITH MARKING DEVICE

[75] Inventors: Kiyoji Nakamura; Hiroyuki Okabayashi; Mutsumi Ashizawa; Ushio Anayama, all of Kanagawa; Shinichi Shidara; Hajime Tachibana, both of Tokyo, all of Japan

[73] Assignee: Fuji Photo Film Co., Ltd., Kanagawa, Japan

[21] Appl. No.: 677,854

[22] Filed: Jul. 10, 1996

[30] Foreign Application Priority Data

Jul. 10, 1995 [JP] Japan ................. 7-195727

[51] Int. Cl.$^6$ ............ G03B 27/32; G03B 27/52; G03B 27/58; G03B 27/62
[52] U.S. Cl. .................. 355/39; 355/40; 355/47
[58] Field of Search ................. 355/39, 40, 47

[56] References Cited

U.S. PATENT DOCUMENTS

| | | | |
|---|---|---|---|
| 5,132,723 | 7/1992 | Gelbart | 355/40 |
| 5,173,731 | 12/1992 | Yahara | 355/40 |
| 5,430,523 | 7/1995 | Tanibata | 355/30 |
| 5,469,241 | 11/1995 | Takahashi et al. | 355/40 |
| 5,508,783 | 4/1996 | Iwagaki et al. | 355/40 |
| 5,617,179 | 4/1997 | Yoshihara | 355/40 |
| 5,617,183 | 4/1997 | Saito et al. | 355/40 |

*Primary Examiner*—R. L. Moses
*Assistant Examiner*—Shival Virmani
*Attorney, Agent, or Firm*—Sughrue, Mion, Zinn, Macpeak & Seas, PLLC

[57] ABSTRACT

An improvement of microfilm camera with a marking device in which an image of a document is photographed on a roll film mounted in a cassette using a slit exposure system and a two-dimensional digital image of a mark is recorded on the roll film. The microfilm camera comprises: an image taking lens for forming the image of the document on the roll film; a mark taking lens having an optical axis inclined in the length side direction of the roll film with respect to that of the image taking lens; and a digital image generator for generating a one-dimensional digital image extending in the width side direction of the roll film and formed by said mark taking lens at or in close vicinity of the image forming position of the image taking lens. The two-dimensional image of the mark is recorded on the film by changing the one-dimensional digital image synchronously with traveling of the film. With such construction, the size of a photographic opening provided in the cassette can be reduced to made the cassette structure simple. It is unnecessary to provide a complicated synchronizing mechanism for setting mark projecting or recording timing.

3 Claims, 8 Drawing Sheets

FIG. 2(A) SCANNER TYPE
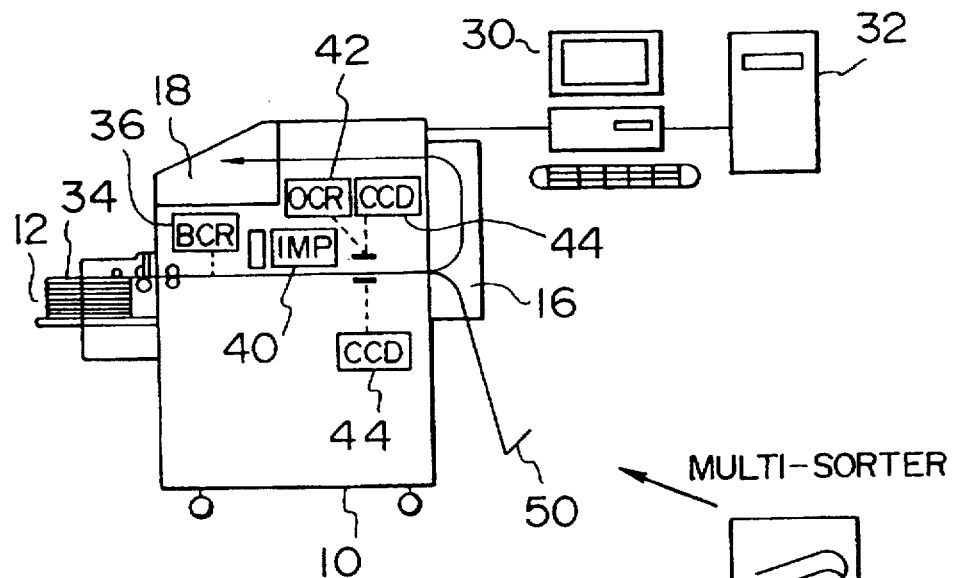
FIG. 2(B) SCANNER AND MICROFILM CAMERA
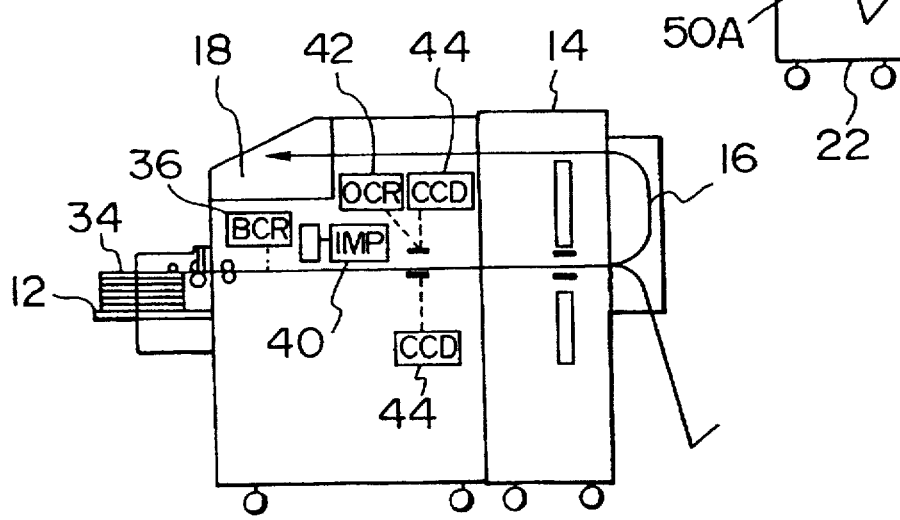

MICROFILM CAMERA WITH MARKING DEVICE

BACKGROUND OF THE INVENTION

1. Field of the Invention

The present invention relates to a marking device of a microfilm camera for recording or superimposing a mark such as a retrieval mark on a roll film mounted in a microfilm cassette when taking a photograph of an image printed on a document using a slit exposure system.

2. Prior Art Statement

When photographing images in respective frames of a document on a microfilm, marks such as blip marks or numbers are generally recorded or superimposed on end faces surrounding the frames for retrieving a target frame. A title of the papers (document) or other character data may be also recorded in or out of the frame of the microfilm.

To record several types of marks or character data (hereinbelow, generically called marks), a known rotary camera has been used as a marking device, in which a two-dimensional digital image of a mark is recorded on a roll film using an LED (light-emitting diode) array by projecting the one dimensional digital image and changing the one-dimensional digital image in synchronism with the movement of the roll film currently in traveling. That is, the two-dimensional digital image of the desired mark is recorded by a dot matrix recording method.

One example of such a structure is disclosed in Japanese Patent Laid-Open Publication No. 6-222476. The device disclosed herein includes an image taking lens for photographing an image of a document on a roll film by a slit exposure system and a mark taking lens arranged in a position apart from the image taking lens for forming a one-dimensional digital image. That is, the image taking lens and the mark taking lens are arranged to be separated enough from each other and optical axes of both the lenses are made vertical with respect to the film surface, respectively.

Another device for recording a blip mark on a roll film is disclosed in Japanese Utility-Model Publication No. 53-50421, in which an image of a document is photographed on the roll film by a taking lens, while an image of a linear arrayed light source is formed in a width end portion of the roll film and outside the image of the document photographed on the roll film using the same taking lens. Still another device is disclosed in Japanese Patent Publication No. 55-44366 (corresponding U.S. Pat. No. 3,757,643), in which a small-sized prism is integrally formed with a lens and arranged close to the film surface so that a light beam can be transmitted from a light source onto the film through the prism.

Further, Japanese Patent Laid-Open Publication No. 5-210170 discloses a marking device including an linear LED array which is located in a position shifted longitudinally from an image forming or focusing position of an image taking lens and opposite to a roll film wrapped around and fed by a photographic roller of a rotary camera, in which a mark is projected and recorded on the roll film by turning on and off the linear LED array in synchronous with traveling of the roll film.

Such conventional devices, however, have the following disadvantages. In other words, the device disclosed in the Japanese Patent Laid-Open Publication No. 6-222476 is required to position the mark taking lens apart from the image taking lens so that the optical axis of the mark taking lens is significantly separate from that of the image taking lens for photographing an image of a document. It is therefore necessary to project and record a mark on a roll film while monitoring the traveling amount of the film, resulting in a complicated mechanism for synchronizing timing of projecting the mark with traveling of the roll film. When a roll film mounted in a microfilm cassette is used for taking a photograph, a large-sized or a plurality of photographic openings, through which the optical axes of both lenses pass, must be formed in the cassette. In this case, a shutter for opening and closing the photographic opening(s) also needs to be increased in size and therefore another problem arises that the roll film shielded by the cassette could be exposed to outside light.

The device disclosed in the Japanese Utility-Model Publication No. 53-50421 is adapted for inserting a blip mark in a position near the edge of the roll film by reducing the light beam of the line source, but it is impossible to record a character mark such as a title over the full width of the roll film or to superimpose a mark on an image of a document photographed on the roll film.

The device disclosed in the Japanese Patent Publication No. 55-44366 (corresponding U.S. Pat. No. 3,757,653) necessitates the prism situated in a position close to the roll film. On the other hand, the device disclosed in the Japanese Patent Laid-Open Publication No. 5-210170 necessitates the LED array. When a roll film mounted in a microfilm cassette is used with such devices, the prism or the LED array needs to be mounted inside the microfilm cassette. For this reason, the cassette structure is made complicated and an electrical connection must be established between the cassette and the camera. Accordingly, the devices are difficult to operate. Further, since the mark taking position or mark recording position is different from the image taking position, a complicated synchronizing mechanism needs to be provided in such devices.

SUMMARY OF THE INVENTION

The present invention has been accomplished under the circumstances as aforementioned, and an object thereof is to provide a marking device of a microfilm camera which can reduce the size of a photographic opening when a roll film mounted in a cassette is used for taking a photograph.

Another object of the present invention is to provide a marking device of a microfilm camera which does not need a complicated synchronizing mechanism for setting mark projecting or recording timing.

Still another object of the present invention is to provide a marking device of a microfilm camera which can record a mark over the full width of the roll film or superimpose the mark on an image of a document photographed on the roll film.

Further object of the present invention is to provide a marking device of a microfilm camera which can make the structure of the microfilm cassette used in the microfilm camera simple.

The objects of the present invention are attained by the provision of a microfilm camera with a marking device, in which an image of a document is photographed on a roll film mounted in a cassette using a slit exposure system and a two-dimensional digital image of a mark is recorded on the roll film, comprising:

an image taking lens for forming the image of the document on the roll film;
 a mark taking lens having an optical axis inclined in the length side direction of the roll film with respect to that of said image taking lens; and a digital image generator for generating a one-dimensional digital image extending in the width side direction of the roll film and formed by said mark taking lens at or in close vicinity of the image forming position of said image taking lens, so that the two-dimensional digital image of the mark is recorded on the roll film by changing the one-dimensional digital image synchronously with traveling of the roll film.

In the microfilm camera, the image taking lens and the mark taking lens are preferably arranged such that the optical axis of the image taking lens passes through the centerline of a photographic roller and the optical axis of the mark taking lens intersects with or is coincident with that of the image taking lens at a point on the surface of the roll film wrapped on the photographic roller.

BRIEF DESCRIPTION OF THE DRAWINGS

The above and other objects and advantages and further description will now be discussed in connection with the drawings, in which:

FIGS. 2(A) and (B) show two simplified diagrams explaining how to use the combined document reader and microfilm camera in FIG. 1;

DETAILED DESCRIPTION OF THE PREFERRED EMBODIMENTS

Figure 3:
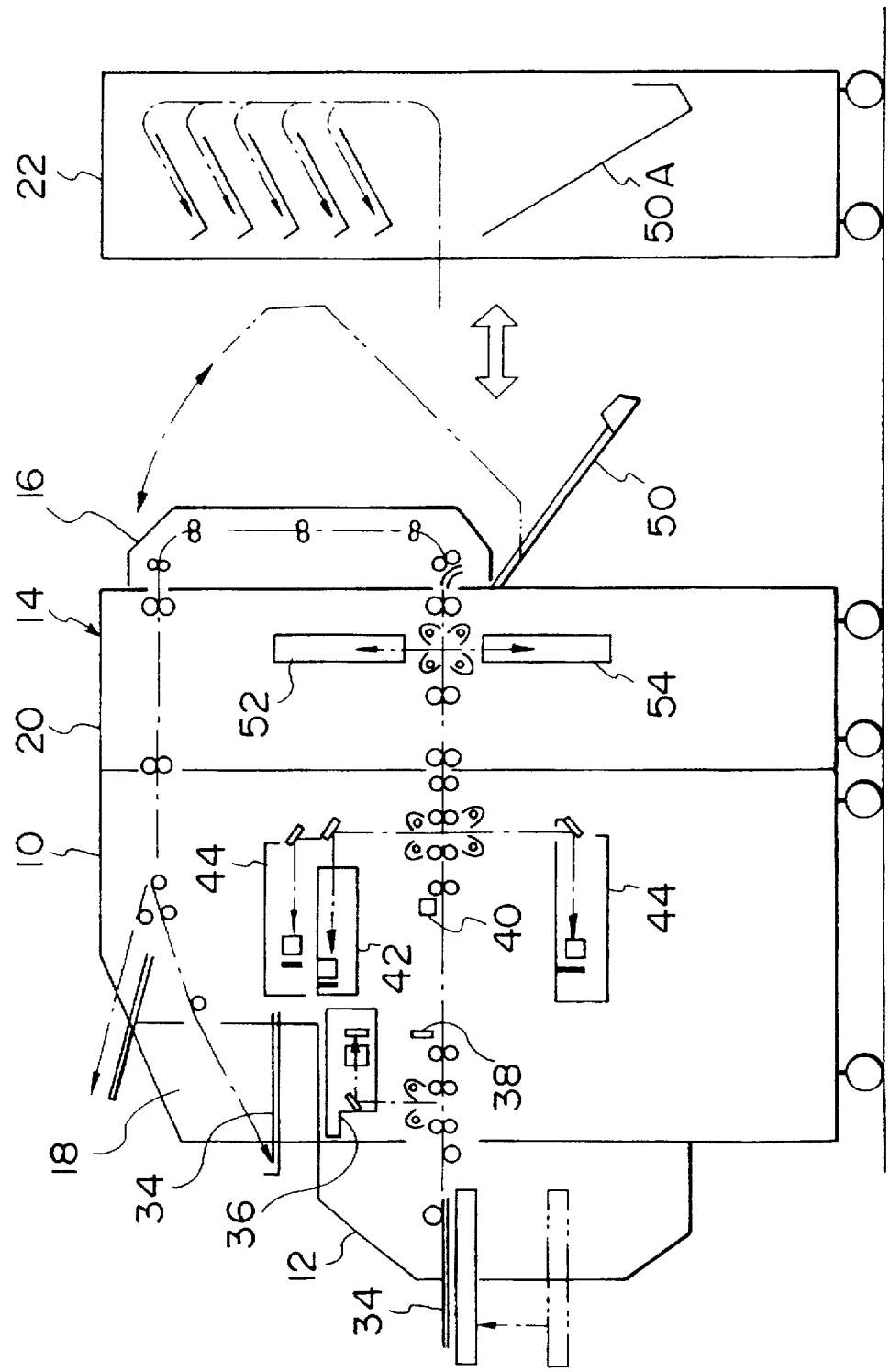
FIG. 3 is a side view showing an inner arrangement of the combined document reader and microfilm camera in FIG. 1.
Figure 4:
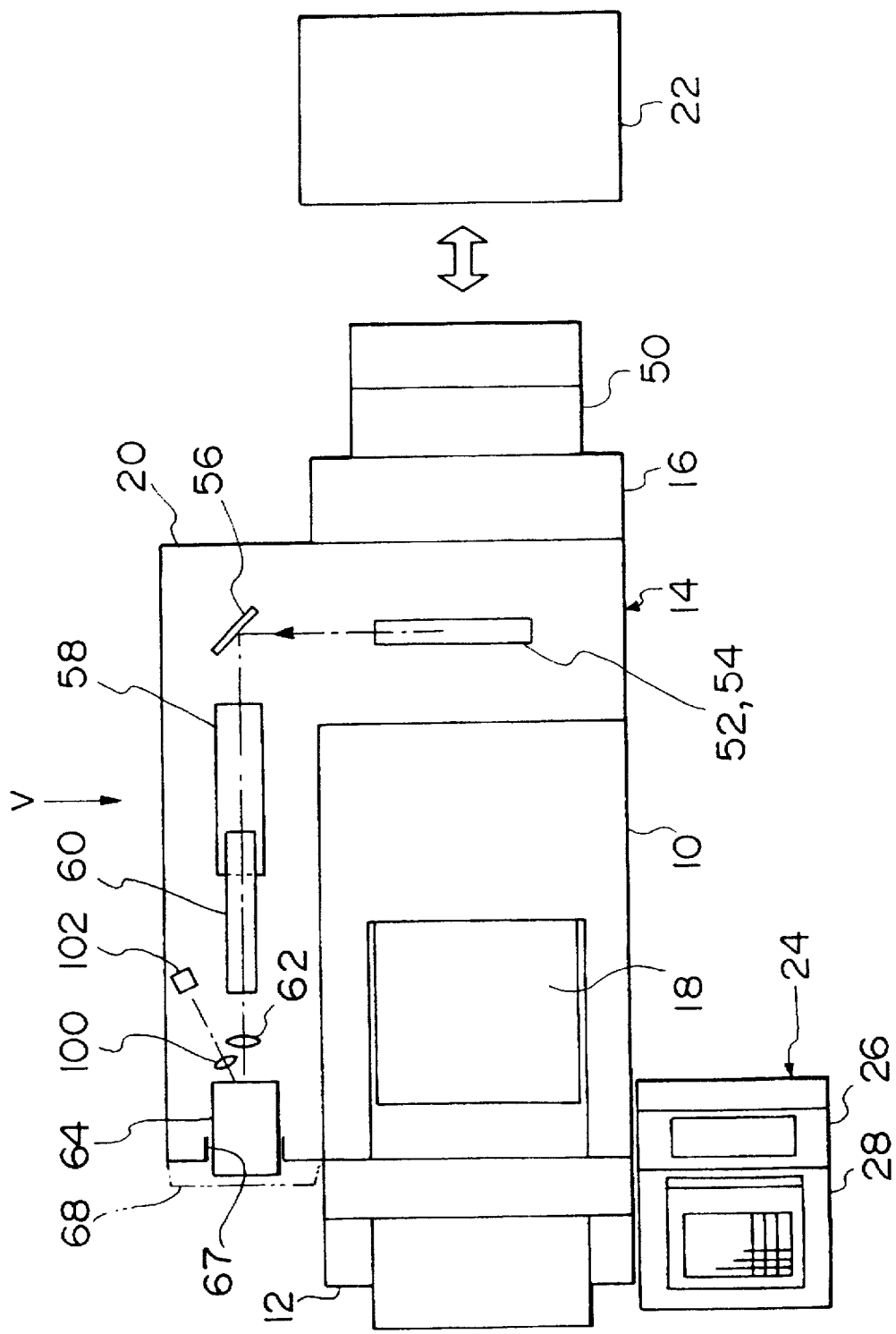
FIG. 4 is a plan view of the combined document reader and microfilm camera in FIG. 1.

Referring to FIGS. 1 to 4, there are shown a scanner 10 constituting a main body of a document reader, an auto-feeder (automatic document feeder: ADF) 12, a microfilm camera 14, a turn unit 16 and a stacker 18. The auto-feeder 12 is removably attached to the front of the scanner 10. The microfilm camera 14 has an L-shaped cabinet 20 as viewed from the top (FIG. 4) and the cabinet 20 surrounds the back and left sides of the scanner 10. In FIGS. 2 to 4, a reference numeral 22 denotes a multi-sorter which can be used instead of the turn unit 16.

Figure 1:
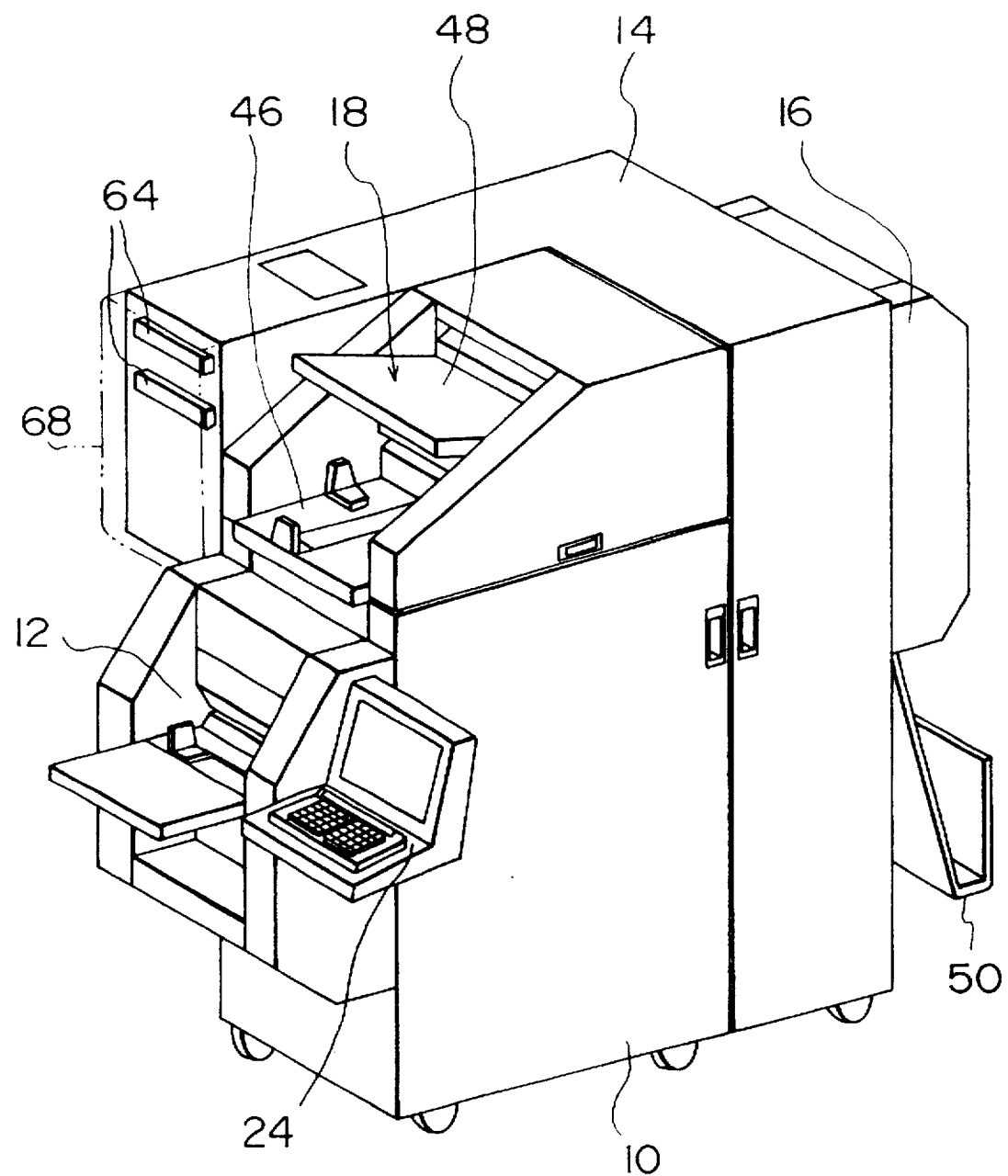
FIG. 1 is a perspective view showing a general structure of combined document reader and microfilm camera to which an embodiment of the present invention is applied.

Referring to FIGS. 1 and 4, there is shown a control unit 24 with a display 26 and a keyboard 28. The control unit 24 is used to display a status and to input or set conditions for controlling the whole system. For example, the control unit 24 is used to select and set reading conditions of the scanner 10 and a photographing mode of the microfilm camera 14.

In FIG. 2A, a reference numeral 30 denotes a personal computer PC (or a work station WS), in which image data and associated attribute information read by the scanner 10 are input to be subjected to a predetermined image processing or processings, and the processed image data is stored in a memory such as magneto-optic disk 32. The processed image data may be supplied to a printer (not shown) as required, or transferred to other computer or image processor.

The scanner 10 is provided with carrying means for carrying document papers 34 one by one from the auto-feeder 12 horizontally and linearly in a back side direction. Each document paper 34 first passes through a bar-code reader (BCR) 36, and a bar code attached to the document 34 in a predetermined position is read by the bar-code reader 36. The bar code contains some information of the document 34, which is used to identify set conditions of the document 34 based on the format number or the like and to select a reading mode of the document 34 from all modes presetting reading conditions needed for an OCR 42 and an image scanner 44 described later.

The reading mode is used to set some reading conditions, such as the image cutout position, discrimination between single-sided and double-sided reading and discrimination between ON and OFF of the scanner 10. The reading data is supplied to the PC (or WS) 30. On receipt of the reading data, the PC (WS) 30 supplies a specified number to an imprinter 40 described later. It should be noted that an OCR (Optical Character Reader) for reading characters may be used instead of the bar-code reader 36 for reading a bar code.

The document paper 34 then passes through a patch reader 38 (FIG. 3). The patch reader 38 detects mark changing information for changing a mark such as a blip mark to be attached when photographing an image of the document 34 on a microfilm. For example, the patch reader 38 sorts data contained in respective documents into the classification levels such as high, intermediate or low level by a certain criteria, according to the partition plate or sheet inserted between document papers. The patch reader 38 may detect data for automatically switching the scanner 10. The data detected by the patch reader 38 are transferred as document or page attribute information to the external PC (WS) 30 via a data transfer interface.

The paper 34 is then numbered by the imprinter (IMP) 40. For example, a document number is attached to the document paper 34, such as the specified number, which was supplied from the PC (WS) 30 in response to the output of the bar-code reader 36, or an ordinal number of the paper 34 which was set in the control unit 24. The OCR 42 reads data containing the document number attached to the paper 34 and supplies the read data to the PC (WS) 30. The read data is either stored in a memory as document or page attribute information together with image data to be read by the image scanner 44 described later, or transferred to the external PC (WS) 30 via an interface.

Represented by reference numerals 44, 44 are image scanners (CCD) each including a CCD arrayed line sensor. The line sensors are arranged perpendicularly to a moving direction of images printed on the front and back faces of the document papers 34 traveling at a constant speed, so that the line sensors read the images of the papers 34 continuously while the papers 34 travel therebetween, i.e., while the papers 34 moves in a sub-scanning or vertical scanning direction. That is, the line sensors read the images of the papers 34 by a slit exposure system.

The CCD 44 cuts out an image in a partial area of a paper 34 in accordance with instructions from the control unit 24 or instructions previously input from the PC (WS) 30 to the CCD line sensor 44. The cutout image is transferred to the PC (WS) 30 via an interface together with image attribute information. The CCD 44 also selects a reading mode automatically based on a format number of the paper 34 read by the bar-code reader 36, and determines the image cutout position, single-sided reading or double-sided reading, and ON or OFF state of each CCD 44. Thus, image reading is performed as a result of such determination. Alternatively, the CCD 44 may obtain reading conditions, such as the image cutout position, which is specified by the PC (WS) 30 based on the format number of the paper 34 detected by the bar-code reader 36, and transfer the image data to the PC (WS) 30 together with associated attribute information.

When using such a device structure in a scanner, as shown in the upper part (A) of FIG. 2, the turn unit 16 is connected to the back side of the scanner 10. The turn unit 16 forces document papers 34 to make a U-turn upward and to continuously feed them through the upper portion of the scanner 10 in a reverse direction. The document papers 34 reversely fed are stacked on the stacker 18 provided in the upper front portion of the scanner 10. The stacker 18 has a pass stacker section 46 (FIG. 1) for turning over the papers normally read and stacking them in the same order as numbered to the papers, and a reject stacker section 48 (FIG. 1) for stacking papers to be reread due to error operation separately from the papers normally read. Also, the reject stacker section 48 may be used only for sorting previously processed papers into two groups.

The turn unit 16 and the scanner 10 are connected with each other through a separable joint (not shown), so that driving force of feed rollers provided inside the scanner 10 can be transmitted to the turn unit 16. As shown in the part (A) of FIG. 2, when connecting the turn unit 16 with the scanner 10, the turn unit 16 can feeds papers at the same speed as the scanner 10 feeds. Further, a straight stacker section 50 is used for ejecting unacceptable papers which are too thick to pass through the turn unit 16.

The multi-sorter 22 may be used instead of the turn unit 16. The multi-sorter 22 sorts and stacks papers 34 previously processed and ejected from the scanner 10, while it collects and stacks thick papers on a straight stacker section 50A.

As shown in the part (A) of FIG. 2, such a structure is used in the scanner type document reader system. When adding a microfilm photographing function to the system, the microfilm camera 14 is provided between the scanner 10 and the turn unit 16. The lower part (B) of FIG. 2 shows a structure of a combined document reader and microfilm camera system. The microfilm camera 14 has a cabinet 20 with the top plane formed into an L type shape as mentioned above, and an optical system is provided inside the cabinet 20 for transmitting images printed on the forth and back faces of a paper 34 to be recorded on a microfilm.

Figure 5:
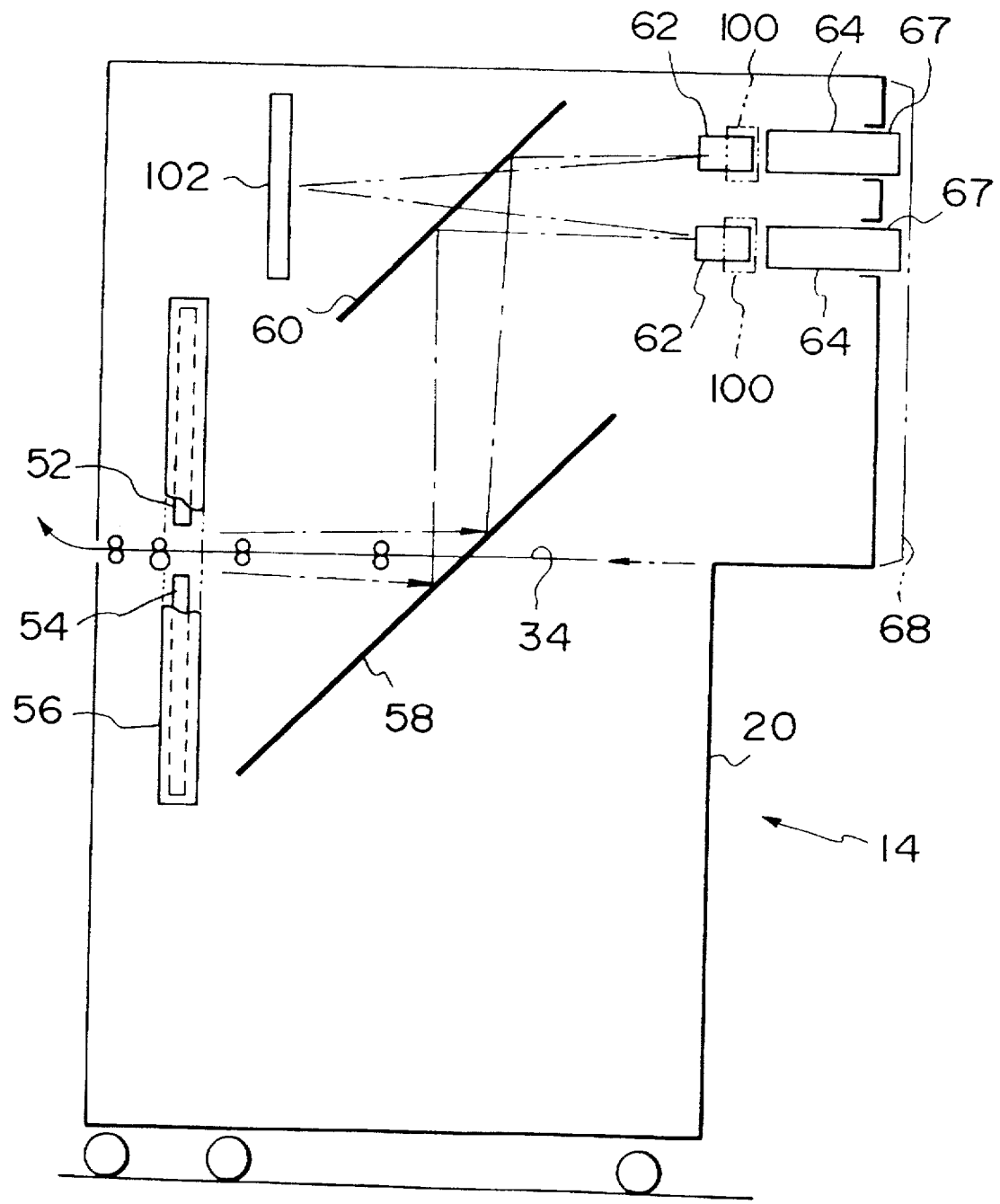
FIG. 5 is a side view showing an optical system of the microfilm camera in FIG. 1, as seen from the side represented by the arrow V in FIG. 4.
Figure 6:
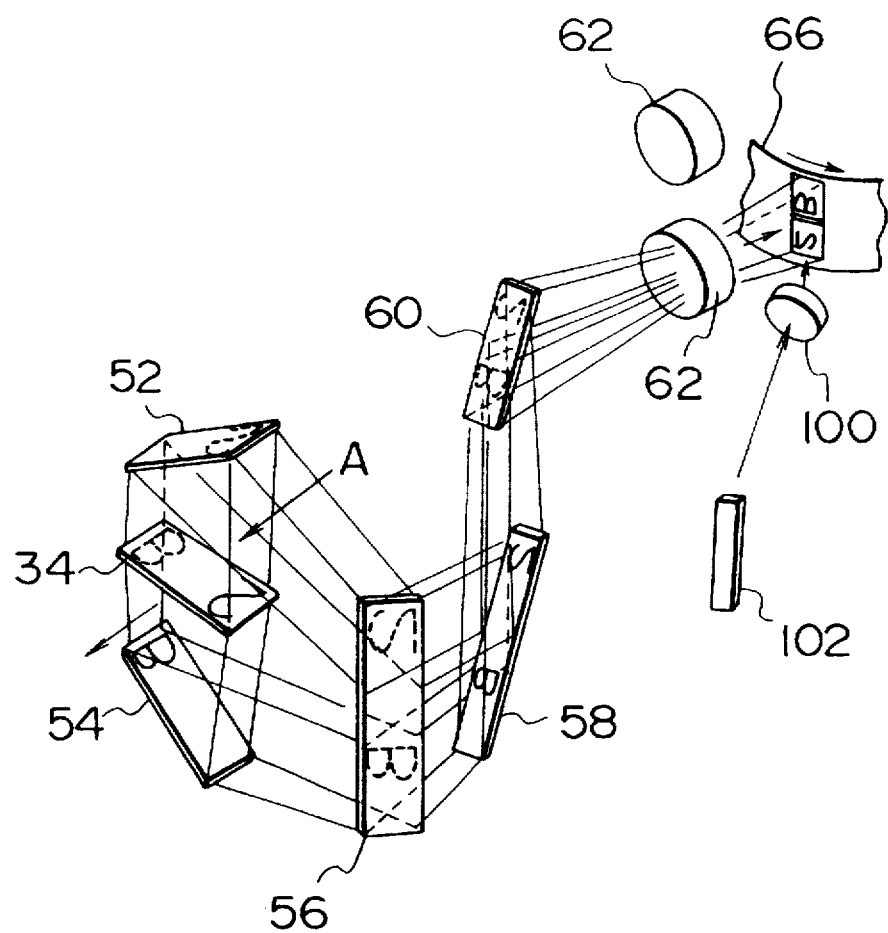
FIG. 6 is a perspective view of the optical system of the microfilm camera shown in FIG. 5.

As shown in FIGS. 4 to 6, the optical system includes first and second mirrors 52, 54 opposite to each other obliquely with respect to the forth and back faces of the document paper 34 and extending in a direction perpendicular to the traveling direction of the paper 34 (the direction represented by the arrow A in FIG. 6); third, fourth and fifth mirrors 56, 58 and 60 for simultaneously reflecting images on the forth and back faces of the paper 34 which were reflected in both the mirrors 52, 54; and two photographic lenses or image taking lenses 62, 62. The optical system may be constituted such that an image printed on either the forth face or the back face of the paper 34 is photographed on a microfilm.

The image taking lenses 62, 62 are opposite to microfilm cassettes 64, 64, respectively, so that images reflected through the mirrors in the optical system can be photographed on microfilms 66 (FIG. 6) by a slit exposure system, each microfilm 66 mounted inside the corresponding microfilm cassette 64 and traveling at a constant speed. As shown in FIG. 6, the images on the forth and back faces of the paper 34 are thus photographed on the microfilm 66 in parallel in the width side direction (duplex method).

The microfilm cassettes 64, 64 are loaded into cassette loading ports 67, 67 from the front of the cabinet 20, respectively. The cassette loading ports 67, 67 are open vertically at two stages and situated on the front panel of the cabinet 20, i.e., provided at the left side of the stacker 18 (see FIGS. 1, 4 and 5). The cassette loading ports 67, 67 are covered with a cover 68 on purpose to shut out light from the outside. Since the cassettes 64, 64 are positioned vertically at two stages so that images of the same paper can be photographed at the same time, simultaneous exposure can be performed to the two microfilms 66, 66, thereby improving efficiency of photographing process. It should be noted that a single cassette loading port 67 may be used for loading only one cassette 64 so that only one microfilm 66 is exposed at a time.

Figure 7:
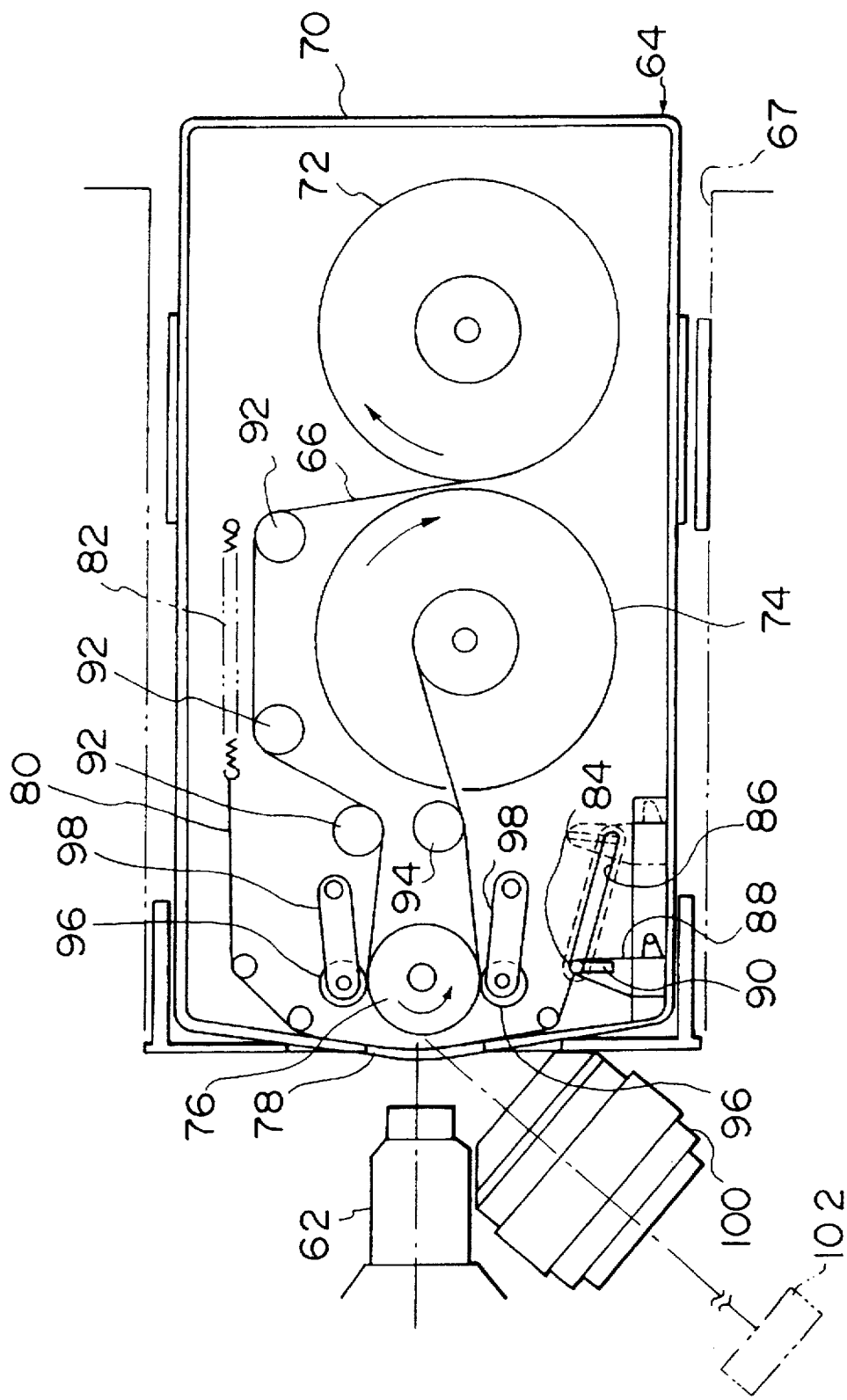
FIG. 7 is a plan view showing an inner arrangement of a microfilm cassette and an arrangement of an image taking lens and a mark taking lens of the microfilm camera according to an embodiment of the present invention.

As shown in FIG. 7, the cassette 64 has a rectangular case 70, and a supply reel 72, a take-up reel 74 and a photographic roller 76 are disposed in the length side direction of the case 70. A photographic opening 78 is provided on one wall side of the case 70 opposite to the photographic roller 76, and a shutter 80 is slidably provided along the inner face of the wall. The shutter 80 is equipped with a window (not shown) for opening and closing the photographic opening 78.

The shutter 80 is then guided by guide pins, with one end of the shutter 80 pulled by a coil spring 82 and the other end thereof attached to a pin 84 movable along an elongated guide hole 86. The pin 84 is moved along the elongated guide hole 86 by a slide member 88 provided inside the case 70. That is, the pin 84 is guided and moved along the elongated guide hole 86 and an elongated hole 90 provided in the slide member 88 while pulling and moving the shutter 80.

When loading the cassette 64 into the cassette loading port 67, the slide member 88 is engaged with a claw (not shown) projecting inwardly in the cassette loading port 67 and pushed on the right hand in FIG. 7. Subsequently, the pin 84 is moved to the right in the elongated hole 86 while pulling and moving the shutter 80, so that the window of the shutter 80 can coincide with the photographic opening 78. Thus, the photographic opening 78 is opened and the microfilm cassette 64 is made ready for taking a photograph.

The roll film 66 is pulled out from the supply reel 72, guided by three guide rollers 92, wrapped around the photographic roller 76, and wound up onto the take-up reel 74 via a guide roller 94. The roll film 66 tightly wrapped around the photographic roller 76 is pressed from the both sides by the nip rollers 96, 96 to secure adherence of the roll film 66 to the photographic roller 76.

Each nip roller 96 is held at a tip of a corresponding lever 98 extending in the length side direction of the case 70. The levers 98, 98 are forced by a torsion spring (not shown) to return to the side of the photographic roller 76.

Represented by reference numerals 100, 100 are mark taking lenses arranged close to the side of the image taking lenses 62, 62, respectively. Each mark taking lens 100 has an optical axis inclined or tilted in the length side direction of the roll film 66 or the film traveling direction with respect to the line perpendicular to the roll film 66 wrapped around the photographic roller 76. On the optical axes of the mark taking lenses 100, 100, digital image generators 102, 102 such as LED (light-emitting diode) arrays are arranged in the width side direction of the roll film 66 (where only one generator is shown in FIGS. 4 and 6). A single-type digital image generator 102 may be used instead of the above generators 102, 102 for projecting digital images such as blip marks on the two microfilms 66, 66 at the same time through the mark photographing lenses 100, 100, respectively.

The digital image generator 102 generates a one-dimensional image which varies in synchronous with the traveling speed of the film 66, and the generated image is photographed through the lens 100 on the film 66 currently in traveling. Thus the digital image generator 102 forms and records the two-dimensional digital image of the desired mark or other data onto the film 66 nearby a photographed image of a document paper or superimposes it on the photographed image.

Figure 8A:
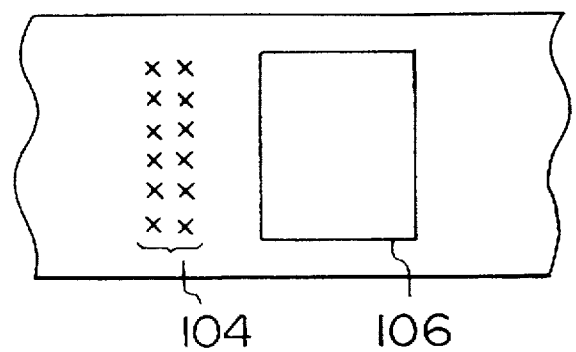
FIGS. 8A to 8C are descriptive diagrams showing examples of retrieval marks recorded or superimposed on the microfilm.
Figure 8B:
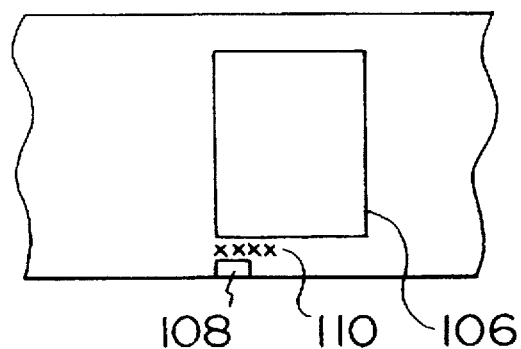
Figure 8C:
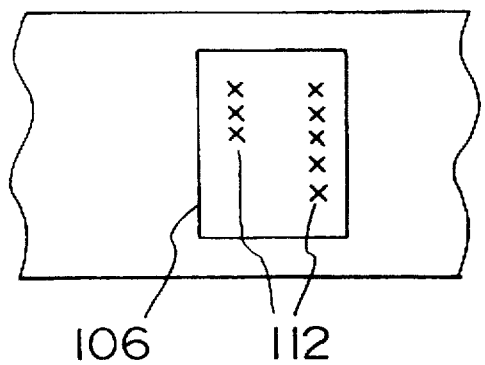

FIG. 8A shows a portion of a microfilm in which a title 104 of a document is inserted before or after an image in a frame 106 photographed on the microfilm. It will be understood that the title 104 may contain other document information such as category, date, location and operator's name. FIG. 8B shows a blip mark 108 and a retrieval number 110 recorded outside of the frame 106, whereas FIG. 8C shows characters 112 superimposed on the photographed image in the frame 106 or image data and the character 112 synthesized in the frame 106. The title 104, the mark 108, the number 110 and the characters 112 shown in FIGS. 8A to 8C may be recorded in combination.

Although the above embodiment showed a structure, in which the document papers 34 are fed horizontally from the front auto-feeder (ADF) 12 toward the inner part, and carried by the turn unit 16 to return to the upper portion of the front scanner 10, the document papers 34 may be carried laterally as seen from the front. In this case, the ADF, the scanner (with or without microfilm camera) and the turn unit must be arranged in the lateral direction in this order. If ADF 12, turn unit 16 and stacker 18 of several types are held in reserve, the variety of combinations will increase.

As described above, according to the microfilm camera of the present invention, an optical axis of a mark taking lens is inclined or tilted in the length side direction of a film with respect to that of an image taking lens for photographing an image of a document on the film, a one-dimensional digital image is formed in a position near the image forming or focusing position of the image taking lens, and the one-dimensional digital image data is changed in synchronous with traveling of the film so that a mark having two dimension can be recorded on the film. Accordingly, the mark taking position and the image taking position on the film are put substantially in the same traveling position of the film, so that it may be unnecessary to provide a synchronizing mechanism in the microfilm camera, or the synchronizing mechanism can be made remarkably simple. Also, it is possible to reduce the size of the photographic opening of the cassette and hence the moving amount of the shutter, resulting in less fear of exposing the film to the outside light.

Further, the two-dimensional mark formed by changing the one-dimensional image synchronously with traveling of the film can be recorded over the full width of the film, so that it is possible to record a title of the frame photographed on the film or to superimpose a mark in the frame. Furthermore, since a prism or an LED does not need mounting in the cassette, the cassette structure can be made simple.

If the image taking lens is arranged on a line passing through the center axis of the photographic roller, the image of the document can be photographed on the film without distortion of the photographed image and lowering the resolution.

What is claimed is:

1. A microfilm camera with a marking device, in which an image of a document is photographed on a roll film mounted in a cassette using a slit exposure system and a two-dimensional digital image of a mark is recorded on the roll film, comprising:

an image taking lens for forming the image of the document on the roll film;

a mark taking lens having an optical axis inclined in the length side direction of the roll film with respect to that of said image taking lens; and a digital image generator for generating a one-dimensional digital image extending in the width side direction of the roll film and formed by said mark taking lens at or in close vicinity of the image forming position of said image taking lens, so that the two-dimensional digital image of the mark is recorded on the roll film by changing the one-dimensional digital image synchronously with traveling of the roll film.

2. The device according to claim 1, wherein the roll film is wrapped around and fed by a photographic roller and the image taking lens is arranged on a line passing through the center axis of the photographic roller.

3. The device according to claim 1, wherein the roll film is tightly wrapped around and fed by a photographic roller, and said image taking lens and said mark taking lens are arranged such that the optical axis of said image taking lens passes through the centerline of the photographic roller and the optical axis of said mark taking lens intersects with that of said image taking lens at a point on the surface of the roll film wrapped around the photographic roller.

* * * * *